(12) United States Patent (10) Patent No.: US 12,337,551 B2
Murphy et al. (45) Date of Patent: Jun. 24, 2025

(54) AUTOMATED FIBER PLACEMENT ROLLER

(71) Applicant: THE BOEING COMPANY, Chicago, IL (US)

(72) Inventors: Julie Frances Murphy, Puyallup, WA (US); Adam La Gorce, Maple Valley, WA (US); Kevin F. Malik, Seattle, WA (US); Alexandra K. Dillon, Seattle, WA (US); Richard V. Phillips, Preston, ID (US)

(73) Assignee: THE BOEING COMPANY, Arlington, VA (US)

( * ) Notice: Subject to any disclaimer, the term of this patent is extended or adjusted under 35 U.S.C. 154(b) by 729 days.

(21) Appl. No.: 17/399,876

(22) Filed: Aug. 11, 2021

(65) Prior Publication Data

US 2022/0126531 A1 Apr. 28, 2022

Related U.S. Application Data

(60) Provisional application No. 63/106,786, filed on Oct. 28, 2020.

(51) Int. Cl.
*B29C 70/00* (2006.01)
*B29C 70/38* (2006.01)

(52) U.S. Cl.
CPC ................... *B29C 70/384* (2013.01)

(58) Field of Classification Search
CPC ............................ B29C 70/384; B29C 70/386
See application file for complete search history.

(56) References Cited

U.S. PATENT DOCUMENTS

| 4,964,053 A | 10/1990 | Humble |
| 5,530,702 A | 6/1996 | Palmer et al. |
| 6,693,539 B2 | 2/2004 | Bowers et al. |

(Continued)

FOREIGN PATENT DOCUMENTS

| WO | WO-2015018799 A1 * | 2/2015 | ........... B29C 70/384 |
| WO | 2018213521 A1 | 11/2018 | |

OTHER PUBLICATIONS

Cast Hi Temp Silicone, https://www.grainger.com/product/HI-TEMP-Silicone-Coated-Fiberglass-5PGV0, printed Aug. 11, 2021, 1 pg.

(Continued)

*Primary Examiner* — Alison L Hindenlang
*Assistant Examiner* — Debjani Roy
(74) *Attorney, Agent, or Firm* — Moore IP Law

(57) ABSTRACT

A roller for automated fiber placement includes a flexible rim member arranged about a central axis. The flexible rim member has an inner side and an outer side, and the central axis is closer to the inner side than to the outer side. The roller also includes a hub member arranged substantially concentric with the flexible rim member about the central axis. The hub member defines an opening to receive a shaft of an automated fiber placement machine. The roller further includes a plurality of curved interconnect members extending between the hub member and the flexible rim member. Each of the plurality of curved interconnect members is elastically deformable to accommodate deformation of the flexible rim member. The roller also includes one or more roller skin layers coupled to the outer side of the flexible rim member.

20 Claims, 9 Drawing Sheets

(56) References Cited

U.S. PATENT DOCUMENTS

| | | | |
|---|---|---|---|
| 7,501,950 | B2 | 3/2009 | Suzuki |
| 7,575,162 | B1 | 8/2009 | Malchak et al. |
| 7,997,486 | B2 | 8/2011 | Ulrich et al. |
| 9,248,591 | B2 | 2/2016 | Caffiau et al. |
| 10,318,770 | B2 | 6/2019 | Jones et al. |
| 10,850,455 | B2 * | 12/2020 | La Gorce .............. B29C 64/218 |
| 2004/0220860 | A1 | 11/2004 | Persky et al. |
| 2011/0011537 | A1 * | 1/2011 | Hamlyn ................ B29C 70/384 |
| | | | 156/436 |
| 2014/0083620 | A1 | 3/2014 | Caffiau et al. |
| 2014/0102625 | A1 | 4/2014 | Mattia |
| 2014/0159869 | A1 | 6/2014 | Zumsteg et al. |
| 2014/0167920 | A1 | 6/2014 | Kamiya |
| 2014/0214577 | A1 | 7/2014 | Acker, Jr. et al. |
| 2016/0253885 | A1 | 9/2016 | Nassar et al. |
| 2018/0336380 | A1 | 11/2018 | Jones et al. |
| 2018/0350218 | A1 | 12/2018 | Jeon et al. |
| 2020/0338839 | A1 * | 10/2020 | La Gorce .............. B29C 64/118 |

OTHER PUBLICATIONS

Flubber-X: https://www.ressinea.com/, printed Aug. 11, 2021, 1 pg.
https://pbipolymer.com/, printed Aug. 11, 2021, 7 pgs.
https://www.aerogel.com/pyrogel/, printed Aug. 11, 2021, 4 pgs.
https://www.designengineering.com/hi-temp-silicone-coating-spray-black/, printed Aug. 11, 2021, 6 pgs.
https://www.techflex.com/high-temperature/dragon-sleeving, printed Aug. 11, 2021, 2 pgs.
https://www.techflex.com/high-temperature/techflex-dragon-blanket-for-welding, printed Aug. 11, 2021, 2 pgs.
https://www.techflex.com/high-temperature/volcano-wrap, printed Aug. 11, 2021, 2 pgs.
Rakhshbahar, et al., "A Novel Approach: Combination of Automated Fiber Placement (AFP) and Additive Layer Manufacturing (ALM)", Journal of Composite Sciences, J. Compos. Sci. 2018, 2, 42, www.mdpi.com/journal/jcs, pp. 1-9.
Extended European Search Report dated Mar. 7, 2022 issued in corresponding EP21205111.4, pp. 1-8.

* cited by examiner

AUTOMATED FIBER PLACEMENT ROLLER

CROSS-REFERENCE TO RELATED APPLICATIONS

The present application claims the benefit of U.S. Provisional Patent Application No. 63/106,786 entitled "AUTOMATED FIBER PLACEMENT ROLLER," filed Oct. 28, 2020, the contents of which are incorporated by reference in their entirety.

FIELD OF THE DISCLOSURE

The present disclosure is generally related to automated fiber placement for composite layup.

BACKGROUND

Composite layup involves forming layers of polymer-embedded fiber material into a specified shape to form an object. The polymer-embedded fiber material can be positioned manually or can be positioned automatically using an automated fiber placement machine. An automated fiber placement machine usually places the polymer-embedded fiber material as strips of material referred to as tows or fiber tows. A roller of the automated fiber placement machine rolls over each tow to compact the tow onto a mandrel or a previously placed layer to form the specified shape.

After one or more layers of the polymer-embedded fiber material are positioned as desired, a polymer of the polymer-embedded fiber material is hardened to secure the polymer-embedded fiber material in position. When the polymer includes a thermoset polymer, the polymer is usually cured by application of heat or ultraviolet light. If the polymer includes a thermoplastic polymer, the polymer is usually softened using heat and hardened by removing heat. High temperatures used to soften thermoplastic polymers can degrade polymer-based rollers. Degrading polymer-based rollers can leave residue on a surface of the polymer-embedded fiber material, which can cause delamination of one or more tows and a need to rework the object.

SUMMARY

In a particular implementation, an automated fiber placement roller includes a flexible rim member arranged about a central axis. The flexible rim member has an inner side and an outer side, and the central axis is closer to the inner side than to the outer side. The automated fiber placement roller also includes a hub member arranged substantially concentric with the flexible rim member about the central axis. The hub member defines an opening to receive a shaft of an automated fiber placement machine. The automated fiber placement roller further includes a plurality of curved interconnect members extending between the hub member and the flexible rim member. Each of the plurality of curved interconnect members is elastically deformable to accommodate deformation of the flexible rim member. The automated fiber placement roller also includes one or more roller skin layers coupled to the outer side of the flexible rim member.

In another particular implementation, an automated fiber placement machine includes a fiber placement head including a roller and a shaft extending through a central opening of the roller. The roller is rotatable about the shaft and includes a flexible rim member arranged about the central axis. The flexible rim member has an inner side and an outer side, and the central axis is closer to the inner side than to the outer side. The roller also includes a hub member arranged substantially concentric with the flexible rim member about the central axis. The hub member defines the central opening. The roller further includes a plurality of curved interconnect members extending between the hub member and the flexible rim member. Each of the plurality of curved interconnect members is elastically deformable to accommodate deformation of the flexible rim member. The roller also includes one or more roller skin layers coupled to the outer side of the flexible rim member. The automated fiber placement machine also includes one or more actuators configured to adjust a relative position of the roller and a workpiece during addition of one or more fiber tows to the workpiece by the fiber placement head.

In a particular implementation, an automated fiber placement roller includes a cylindrical core having an outer side arranged about a central axis, a first edge, and a second edge. The cylindrical core defines a plurality of openings that extend between the first edge and the second edge. The outer side is flexible in a direction parallel to the central axis and is flexible radially relative to the central axis. The automated fiber placement roller also includes a compliant layer including a first material coupled to the outer side of the cylindrical core. The automated fiber placement roller further includes an outer layer including a second material coupled to the compliant layer.

In another particular implementation, an automated fiber placement machine includes a fiber placement head including a roller and a shaft extending through a central opening of the roller. The roller is rotatable about the shaft and includes a cylindrical core having an outer side arranged about a central axis, a first edge, and a second edge. The cylindrical core defines a plurality of openings that extend between the first edge and the second edge. The outer side is flexible in a direction parallel to the central axis and is flexible radially relative to the central axis. The roller also includes a compliant layer including a first material coupled to the outer side of the cylindrical core. The roller further includes an outer layer including a second material coupled to the compliant layer. The automated fiber placement machine also includes one or more actuators configured to adjust a relative position of the roller and a workpiece during addition of one or more fiber tows to the workpiece by the fiber placement head.

DETAILED DESCRIPTION

Figure 1:
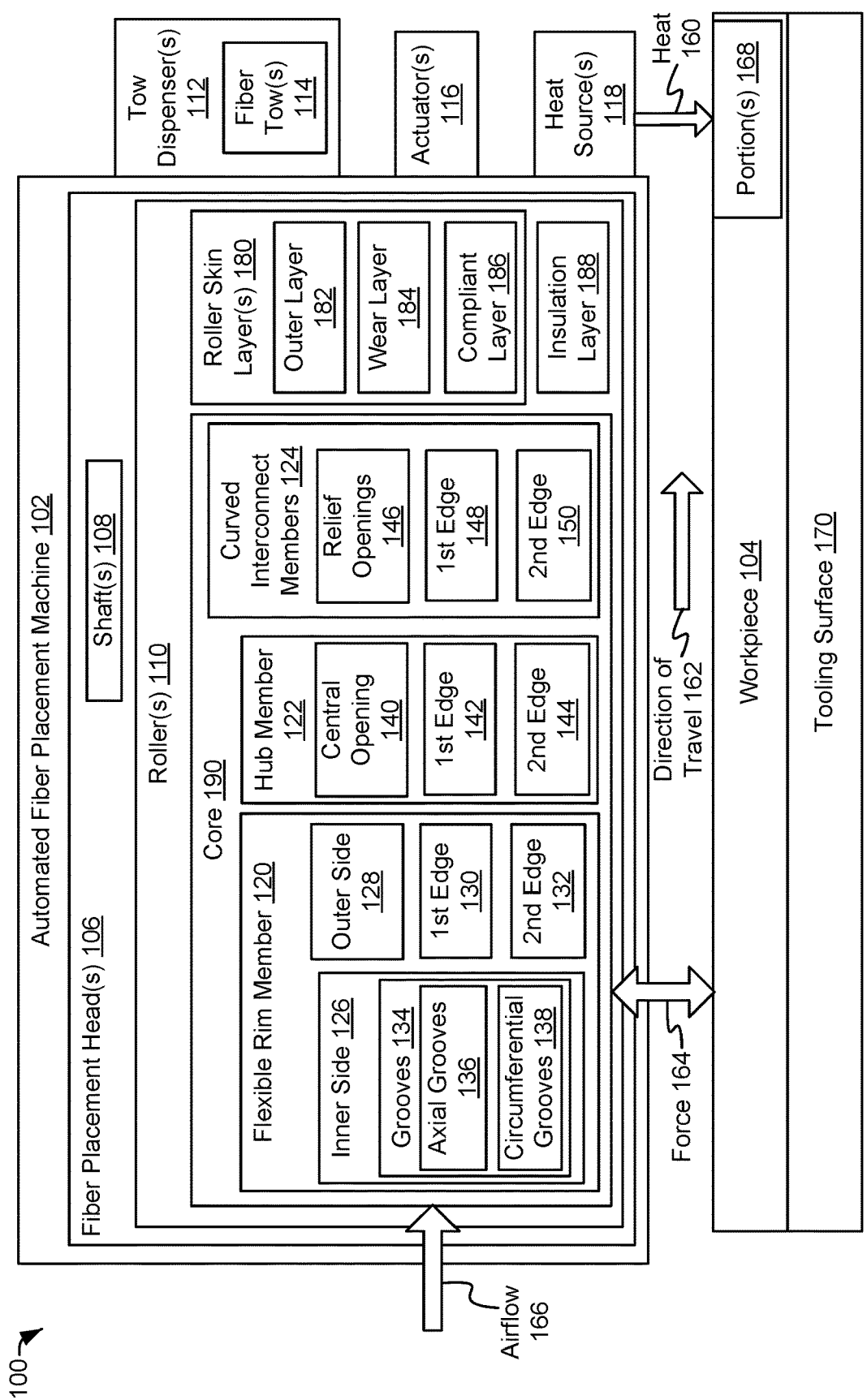
FIG. 1 is a diagram that illustrates an example of a system for automated fiber placement according to a particular implementation.

Particular implementations are described herein with reference to the drawings. In the description, common features are designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 2, multiple actuators 116A and 116B are shown. When referring to a particular one of these actuators, such as the actuator 116A, the distinguishing letter "A" is used. However, when referring to any arbitrary one of these actuators or to these actuators as a group, the reference number 116 is used without a distinguishing letter.

As used herein, various terminology is used for the purpose of describing particular implementations only and is not intended to be limiting. For example, the singular forms "a," "an," and "the" are intended to include the plural forms as well, unless the context clearly indicates otherwise. Further, the terms "comprise," "comprises," and "comprising" may be used interchangeably with "include," "includes," or "including." Additionally, it will be understood that the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority, order, or position of the element with respect to another element, but rather merely distinguishes the element from another element having a same name (but for use of the ordinal term). As used herein, the term "set" refers to a grouping of one or more elements, and the term "plurality" refers to multiple elements.

In the present disclosure, terms such as "determining", "calculating", "generating", "adjusting", "modifying", etc. may be used to describe how one or more operations are performed. It should be noted that such terms are not to be construed as limiting and other techniques may be utilized to perform similar operations. Additionally, as referred to herein, "generating", "calculating", "using", "selecting", "accessing", and "determining" may be used interchangeably. For example, "generating", "calculating", or "determining" a parameter (or a signal) may refer to actively generating, calculating, or determining the parameter (or the signal) or may refer to using, selecting, or accessing the parameter (or signal) that is already generated, such as by another component or device. Additionally, "adjusting" and "modifying" may be used interchangeably. For example, "adjusting" or "modifying" a parameter may refer to changing the parameter from a first value to a second value (a "modified value" or an "adjusted value"). As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive electrical signals (digital signals or analog signals) directly or indirectly, such as via one or more wires, buses, networks, etc. As used herein, "directly coupled" may include two devices that are coupled (e.g., communicatively coupled, electrically coupled, or physically coupled) without intervening components.

A particular aspect of the disclosure relates to a roller for automated fiber placement. The roller has one or more roller skin layers around a flexible core. For example, the roller skin layer(s) may include one or more polymer layers. The flexible core has airflow channels to facilitate removal of heat from the roller skin layer(s) of the roller. The roller is designed to withstand high temperatures and is flexible enough to be used to manufacture contoured parts.

In some implementations, the core is designed to enable low cost manufacturing of the core such as via injection molding, compression molding, or additive manufacturing processes (e.g., three-dimensional (3D) printing). For example, in implementation designed for additive manufacturing, various feature of the core are shaped and sized to be additively manufactured without the use of support structures that are subsequently removed. As another example, in implementations designed for compression molding or injection molding, internal voids may be omitted to enable use of simpler molds. Such implementations, limit post fabrication processing that would otherwise be needed, such as cleanup of support structures used in 3D printing. In some implementations, the core is a single unitary body formed of metal or one or more polymers.

In a particular implementation, the core is cylindrical with an outer side arranged about a central axis. The outer side is flexible in a direction parallel to the central axis and is flexible radially relative to the central axis. For example, the roller includes a flexible rim member, a hub member, and a plurality of curved interconnect members (also referred to herein as "interconnect members" for ease of reference) extending between the flexible hub member and the rim member. The interconnect members are configured to elastically deform responsive to force applied to the flexible rim member. The interconnect members also act as heat sinks to remove heat from the metallic rim member. To illustrate, the interconnect members define a plurality of openings that extend between a first end and a second end of the core. The openings between the interconnect members facilitate heat dissipation into the ambient surroundings or into a cooling medium (e.g., cooling air) blown through the openings.

In some implementations, an inner side of the flexible rim member includes a plurality of grooves to improve the flexibility of the flexible rim member (e.g., to reduce force required to elastically deform the flexible rim member). For example, the grooves can include axial grooves, circumferential grooves, or both. In some implementations, the flexible rim member and the interconnect members deform elastically responsive to forces up to 40 pounds of force applied to the outer side. In a particular implementation, the flexible rim member and the interconnect members deform elastically responsive to forces up to 160 pounds of force applied to the outer side.

One or more roller skin layers are coupled to the outer side of the flexible rim member. For example, the one or more roller skin layers include a compliant layer to improve compliance of the roller. To illustrate, the compliant layer may be designed to give the roller a specified Shore hardness (e.g., in a range between 40 and 100). The one or more roller skin layers also include an outer layer coupled to the compliant layer. The outer layer has a high degradation temperature to resist degradation due to temperatures used to soften thermoplastic polymers during automated fiber placement. In some implementations, the roller skin layers also include a wear layer between the outer layer and the compliant layer to improve the durability of the compliant layer. In some implementations, an insulation layer is disposed between the roller skin layers and the flexible rim member.

In some implementations, the roller is able to withstand high temperature operation without degradation. For example, the roller does not soften or off-gas at temperatures consistent with softening of thermoplastic polymers, such as temperatures greater than 270 degrees Celsius (° C.). In some implementations, materials used to form the roller are stable (e.g., are not damaged by) exposure to temperatures of at least 700 to 750° C. Thus, in addition to being readily manufactured using molding or additive manufacturing techniques, the roller disclosed herein is not damaged by operating conditions that damage polymer-based rollers.

FIG. 1 is a diagram that illustrates an example of a system 100 for automated fiber placement according to a particular implementation. The system 100 includes an automated fiber placement machine 102 and a tooling surface 170. The tooling surface 170 is a surface of a mold or mandrel upon which a workpiece 104 is fabricated using multiple layers of composite material. The composite material includes one or more fiber tows 114 applied to the tooling surface 170 by the automated fiber placement machine 102. In some implementations, the fiber tows 114 are applied to form several layers (e.g., plies) of fibers to build up the workpiece 104 on the tooling surface 170.

The automated fiber placement machine 102 includes one or more fiber placement heads 106, one or more tow dispensers 112, one or more actuators 116, and one or more heat sources 118. Each tow dispenser 112 is configured to provide fiber tows 114 to the fiber placement head(s) 106. In a particular implementation, each tow dispenser 112 includes a reel of fiber tow material (e.g., fiber tape) and passively dispenses the fiber tow material. For example, the fiber placement head(s) 106 pull the fiber tow material from the reel as the fiber placement head 106 applies the fiber tows 114 to the workpiece 104.

The one or more actuators 116 include one or more rotary actuators, one or more linear actuators, or combinations thereof, to move the fiber placement head 106 relative to the workpiece 104, to move the workpiece 104 relative to the fiber placement head 106, or both. The relative movement of the workpiece 104 and the fiber placement head 106 allows the fiber placement head 106 to apply the fiber tows 114 continuously over the tooling surface 170 or to particular target portions of the tooling surface 170 to build (or build up) the workpiece 104.

The heat source(s) 118 are configured to direct heat 160 at one or more targeted portions 168 of the workpiece 104 or of the tooling surface 170. In the specific implementation illustrated in FIG. 1, the fiber tows 114 include a plurality of fibers coupled to or embedded within a thermoplastic polymer, and the heat source(s) 118 applies the heat 160 to the portion(s) 168 to soften the thermoplastic polymer to facilitate adhesion between the fiber tows 114 in different layers of the workpiece 104. In some implementations, the heat source(s) 118 are configured to, during a fiber placement operation, heat portions of the workpiece 104 to a local temperature greater than 425° C. For example, as the actuator(s) 116 move the fiber placement head 106 along a direction of travel 162 relative to the workpiece 104, the heat source(s) 118 heat the portion(s) 168 ahead of one or more rollers 110 of the fiber placement head 106. The roller(s) 110 apply the fiber tow(s) 114 to the workpiece 104 and apply a force 164 to consolidate layers of the workpiece 104. In some implementations, the rate of relative motion between the workpiece 104 and the fiber placement head 106 can be controlled to cause the heat source(s) 118 to heat the portion 168 of the workpiece 104 to a working temperature that is greater than a glass transition temperature of a thermoplastic polymer of the fiber tows 114. In some implementations, a power output of the heat source(s) 118, an orientation of the heat source(s) 118, or both, is controlled to cause the heat source(s) 118 to heat the portion 168 of the workpiece 104 to a working temperature that is greater than a glass transition temperature of the thermoplastic polymer.

Each fiber placement head 106 includes one or more shafts 108. One or more rollers 110 are coupled to each shaft 108. The roller(s) 110 are configured to press one or more fiber tows 114 onto the tooling surface 170 or onto a previously applied layer of the workpiece 104. Each roller 110 includes a core 190 (e.g., a cylindrical core) that includes a flexible rim member 120, a hub member 122, multiple curved interconnect members 124 ("interconnect members") extending between the flexible rim member 120 and the hub member 122. The roller(s) 110 also include one or more roller skin layers 180 coupled to the flexible rim member 120. FIGS. 3A-3D, 4A-4D, 5, 6, and 7 illustrate examples of implementations of the roller(s) 110.

The core 190 is cylindrical, and the hub member 122 includes a central opening 140 to receive the shaft 108 of the fiber placement head 106. In some implementations, the roller 110 is freely rotatable about the shaft 108. In some such implementations, the shaft 108 and the central opening 140 have a round cross-section, and a set of bearings are disposed between the shaft 108 and the hub member 122. In other implementations, the roller 110 rotates with the shaft 108. For example, the central opening 140 has a cross-section that is not round (e.g., keyed or square), and the shaft 108 has a corresponding shape to retain the roller 110. In this example, the shaft 108 includes bearings, or the shaft 108 is driven to cause rotation of the roller 110 during operation.

The interconnect members 124 are curved to facilitate flexing (e.g., elastic deformation) along a length of each interconnect members 124 between the hub member 122 and the flexible rim member 120. In a particular implementation, each of the interconnect members 124 defines an S-shaped curve in a radial direction (e.g., extending along a direction corresponding to a radius of the roller 110). The roller 110 includes at least two interconnect members 124, and generally includes eight or more interconnect members 124. The interconnect members 124 are substantially evenly spaced apart circumferentially (e.g., in a direction corresponding to or along a circumference of the roller 110). Spaces between the interconnect members 124 facilitate cooling of the roller 110. For example, a coolant, such as air of an airflow 166, can flow between and over the interconnect members 124 to remove heat from the roller 110. In some implementations, such as illustrated in FIG. 4A-4D, the hub member 122 includes an inner hub member and an outer hub member, and a plurality of openings are defined between the inner hub member and the outer hub member. In such implementations, a portion of the airflow 166 passes between the inner hub member and the outer hub member.

In some implementations, each of the interconnect members 124 includes a plurality of relief openings 146. The relief openings 146 improve heat removal by increasing a surface area for contact with the airflow 166. The relief opening 146 are also sized and shaped to adjust (e.g., tune) elastic deformation characteristics (e.g., stiffness) of the curved interconnect members 124. For example, an interconnect member 124 can include many relatively small relief openings 146 along an interface with the flexible rim member 120 to facilitate small deformations due to local variations in force applied to the flexible rim member 120 (e.g., due to bumps in the surface of the workpiece 104). In this example, the interconnect member 124 can also include a smaller number of relatively large relief openings 146 closer to the hub member 122 to adjust overall deformation characteristics of the interconnect member 124.

The flexible rim member 120 includes an inner side 126 and an outer side 128, where a central axis of the roller 110 is closer to the inner side 126 than to the outer side 128. The roller skin layer(s) 180 are coupled to the outer side 128. In some implementations, the flexible rim member 120 includes a plurality of grooves 134 to make the flexible rim member 120 more flexible (less stiff). In the example illustrated in FIG. 1, the grooves 134 are formed on the inner side 126 of the flexible rim member 120. In other examples, the grooves 134 are formed on the outer side 128 of the flexible rim member 120. Having the grooves 134 on the outer side 128 of the flexible rim can facilitate adhesion of the roller skin layer(s) 180 to the outer side 128. In still other examples, the grooves 134 are formed on both the inner side 126 and the outer side 128.

Due to the flexibility of the core 190 and compliance of the roller skin layer(s) 180, the flexible rim member 120 is able to flex to maintain contact between the fiber tows 114 and the workpiece 104 over curves of the workpiece 104. In some implementations, the grooves 134 enable the flexible rim member 120 to flex in multiple directions. For example, the flexible rim member 120 is flexible in a direction parallel to the central axis and is flexible radially relative to the central axis. The grooves 134 can include axial grooves 136, circumferential grooves 138, or both. In this context, "axial" means oriented in a direction that is parallel to or along a central axis of the roller 110, and "circumferential" means oriented in a direction that is similar to (e.g., concentric with) a circumference of the roller 110.

In the example illustrated in FIG. 1, the roller skin layer(s) 180 include an outer layer 182, a wear layer 184, and a compliant layer 186. An insulation layer 188 is disposed between the core 190 and the roller skin layer(s) 180. In some implementations, the roller skin layer(s) 180 include polymeric materials, or a combination of polymeric and non-polymeric materials (e.g., non-polymeric materials in a polymer matrix). To illustrate, the compliant layer 186 may include glass fibers in a polymer aerogel matrix. Additionally, or alternatively, one or more of the roller skin layer(s) 180 may include a non-polymeric material. To illustrate, the outer layer 182 may include a release layer that is sprayed onto the wear layer 184 (or on the compliant layer 186 if the wear layer 184 is omitted).

The material of the compliant layer 186 and thickness of the compliant layer 186 are selected to give the roller 110 required compliance and degradation temperature for a particular application. Compliance of the roller 110 facilitates compaction of fiber tows in regions with surface irregularities, edges, valleys, or hills. In particular implementations, the material and thickness of the compliant layer 186 is selected to give the roller 110 a Shore A hardness of between 40 and 100. Examples of materials that have sufficiently high degradation temperatures and appropriate hardness to form the compliant layer 186 include a high-temperature silicone polymer material or a fluoroelastomer polymer material. In a particular implementation, the compliant layer 186 includes fiberglass in an amorphous silica, methylsilylated silica aerogel matrix, such as a Pyrogel® XTF material, a Pyrogel® XTE material, or a Pyrogel® HPS material (Pyrogel is a registered trademark of Aspen Aerogels, Inc. of Northborough, Massachusetts, USA). In another particular implementation, the compliant layer 186 includes a silicone coated fiberglass material, such as a HI TEMP Welding Blanket available from W. W. Grainger, Inc. of Lake Forest, Illinois, USA. In another particular implementation, the compliant layer 186 includes a flexible, epoxy-based resin foam including graphene (e.g., graphene strips, platelets, or powder), such as a high heat tolerant graphene resin blend available from Ressinea of Houston, Texas, USA.

The wear layer 184 is coupled to the compliant layer 186 to reduce the direct heat exposure of the compliant layer 186, to protect the workpiece 104 from byproducts of degradation of the compliant layer 186, to reduce adhesion between the workpiece 104 and the roller 110, or a combination thereof. For example, in a particular implementation, the wear layer 184 has a degradation temperature greater than or equal to 425 degrees Celsius. The wear layer 184 may include, for example, a fluorinated ethylene propylene polymer material, a perfluoroalkoxy alkane polymer material, or a graphene resin material.

In some implementations, the outer layer 182 corresponds to or includes a release layer to reduce adhesion between the workpiece 104 and the roller 110. The outer layer 182 has a degradation temperature greater than or equal to 425 degrees Celsius. For example, the outer layer 182 may include a polybenzimidazole material or a high-temperature silicone polymer material. In some implementations, the outer layer 182 includes a thin sheet of the Pyrogel® XTF material, a Pyrogel® XTE material, or a Pyrogel® HPS material. When configured as a release layer, the outer layer 182 is relatively thin in comparison to the compliant layer 186. For example, in some implementations, the outer layer 182 is applied on the roller 110 as a thin sheet, a spray, or a liquid.

Although FIGS. 1 and 3-7 illustrate the roller skin layer(s) 180 as including three distinct layers, in other implementations, the roller skin layer(s) 180 include more, fewer, or different layers. For example, in some implementations, the wear layer 184 is omitted. Additionally or alternatively, the insulation layer 188, the outer layer 182, or both, may be omitted. In some implementations, the outer layer 182 and the compliant layer 186 are the same (e.g. one material is used for both layers). The specific arrangement of and materials of the roller skin layer(s) 180 are selected to ensure that the degradation temperature of the roller skin layer(s) 180 is compatible with process conditions present during application of fiber tow(s) 114 of the workpiece 104 and to ensure chemical compatibility between the portions of the roller skin layer(s) 180 that contact the workpiece 104 and materials of the workpiece 104. In this context, chemical compatibility includes the roller skin layer(s) 180 not leaving chemical residue on the workpiece that degrades the durability of the finished workpiece 104, causes rework of the in-process workpiece 104, or both. For example, the outer layer 182 may be omitted if the wear layer 184 and/or compliant layer 186 are sufficiently heat tolerant and not prone to leave significant chemical residue under process conditions. However, many materials that have the flexibility and durability to be used as the compliant layer 186 have relatively low degradation temperatures or tend to leave contaminants on the surface of the workpiece 104 during processing. Accordingly, the wear layer 184, the outer layer 182, or both, are used when the compliant layer 186 is formed of such materials. Additional considerations may also drive the selection of material used for the various roller skin layer(s) 180, such as per-unit cost, surface reflectivity (e.g., when a laser is used at the heat source 118), surface smoothness or release characteristics, tiered thermal limits, ease of repair and reusability of the roller(s) 110, etc.

If present, the insulation layer 188 is disposed between the core 190 (e.g., between the outer side 128 of the flexible rim member 120) and the compliant layer 186. The insulation layer 188 reduces heat flow between the roller skin layer(s) 180 and the core 190. For example, the insulation layer 188 may be used when the core 190 is formed of a polymer with a lower degradation temperature that the degradation temperature(s) of the roller skin layer(s) 180. As another example, the insulation layer 188 may be used to limit heat removed via the airflow 166 in order to regulate a temperature of the roller 110. To illustrate, while the fiber tows 114 are being applied by the roller 110, a surface of the roller 110 that contacts the fiber tows 114 may be maintained at or above a processing temperature associated with the fiber tows 114, such as great than or equal to a glass transition temperature of a polymer of the fiber tows 114. The insulation layer 188 includes, for example, semi-crystalline polymers, carbon felt blankets or wraps, or fiberglass materials. Examples of materials that may be used for the insulation layer 188 include Dragon Sleeve® material, Dragon Blanket® material, and Volcano® Wrap material (Dragon Sleeve®, Dragon Blanket®, and Volcano® are registered trademarks of Techflex, Inc. of Sparta, New Jersey).

In a particular implementation, the core 190 is a single unitary (e.g., monolithic) body that includes the flexible rim member 120, the hub member 122, and the interconnect members 124. Additionally, in some implementations, respective edges of the flexible rim member 120, the hub member 122, and the interconnect members 124 are coplanar. For example, the flexible rim member 120 includes a first edge 130 and a second edge 132, the hub member 122 includes a first edge 142 and a second edge 144, and each of the interconnect members 124 includes a first edge 148 and a second edge 150. In this example, the first edges 130, 142, 148 are aligned (e.g., coplanar) with one another. To illustrate, the roller 110 can be manufactured using an additive manufacturing process to build the roller 110 on a build platform. In this illustrative example, the first edges 130, 142, 148 can correspond to portions of the roller 110 that contact the build platform during the additive manufacturing process and are therefore coplanar with one another. In some implementations, the second edges 132, 144, 150 are also aligned (e.g., coplanar) with one another.

During operation of the system 100, the heat source(s) 118 apply heat 160 to a portion 168 of the workpiece 104, the tooling surface 170, or both. The heat 160 is sufficient to soften a thermoplastic polymer of the fiber tows 114. For example, the portion 168 may be heated to a temperature that is greater than or equal to a glass transition temperature of the thermoplastic polymer.

Concurrently with or after the heat source(s) 118 heat the portion 168, the actuator(s) 116 move the fiber placement head 106 over the workpiece 104 or the tooling surface 170. The actuator(s) 116 also apply a force to the fiber placement head 106 to press the roller(s) 110 into contact with the workpiece 104. The roller(s) 110 press the fiber tow(s) 114 into contact with a surface of the workpiece 104. While the roller(s) 110 are in contact with or sufficiently near the heated portion 168 of the workpiece 104, the roller(s) 110 conduct heat away from the heated portion 168 to increase adhesion of the fiber tow(s) 114 to the heated portion 168. Heat removed from the heated portion 168 by the roller(s) 110 can be removed from the roller(s) 110 by a coolant (e.g., air of the airflow 166) flowing between the interconnect members 124. Removing heat from the fiber tow(s) 114 using the roller(s) 110 can reduce subsequent processing. For example, a next layer of fiber tow(s) 114 can be added without delay (or with less delay) to allow for consolidation of the layers of the workpiece 104 (e.g., allowing the thermoplastic polymer to cool and harden).

The roller(s) 110 disclosed herein are able to withstand repeated use at high temperatures and with application of significant force 164 without degradation. For example, the roller skin layer(s) 180 have a degradation temperature that is greater than the temperature of the heated portion 168. In this context, "degradation temperature" refers to a charring temperature, a glass transition temperature, a melting temperature, or another temperature at which one or more of the roller skin layer(s) 180 undergoes a phase change or a chemical reaction (e.g., oxidation) when exposed to conditions present during operation of the system 100.

Further, in some implementations, the roller(s) 110 disclosed herein do not off-gas at high temperatures. In addition, the openings of the core 190 enable greater heat removal than can be achieved by solid core rollers. As such, using the roller(s) 110 can improve the fiber placement operation by removing some of the heat 160 as the roller(s) 110 press the fiber tows 114 to the workpiece 104, which allows the thermoplastic polymer of the fiber tows 114 to cool and adhere to underlying layers of the workpiece 104 thereby reducing subsequent processing, such as consolidation and curing operations.

Figure 2:
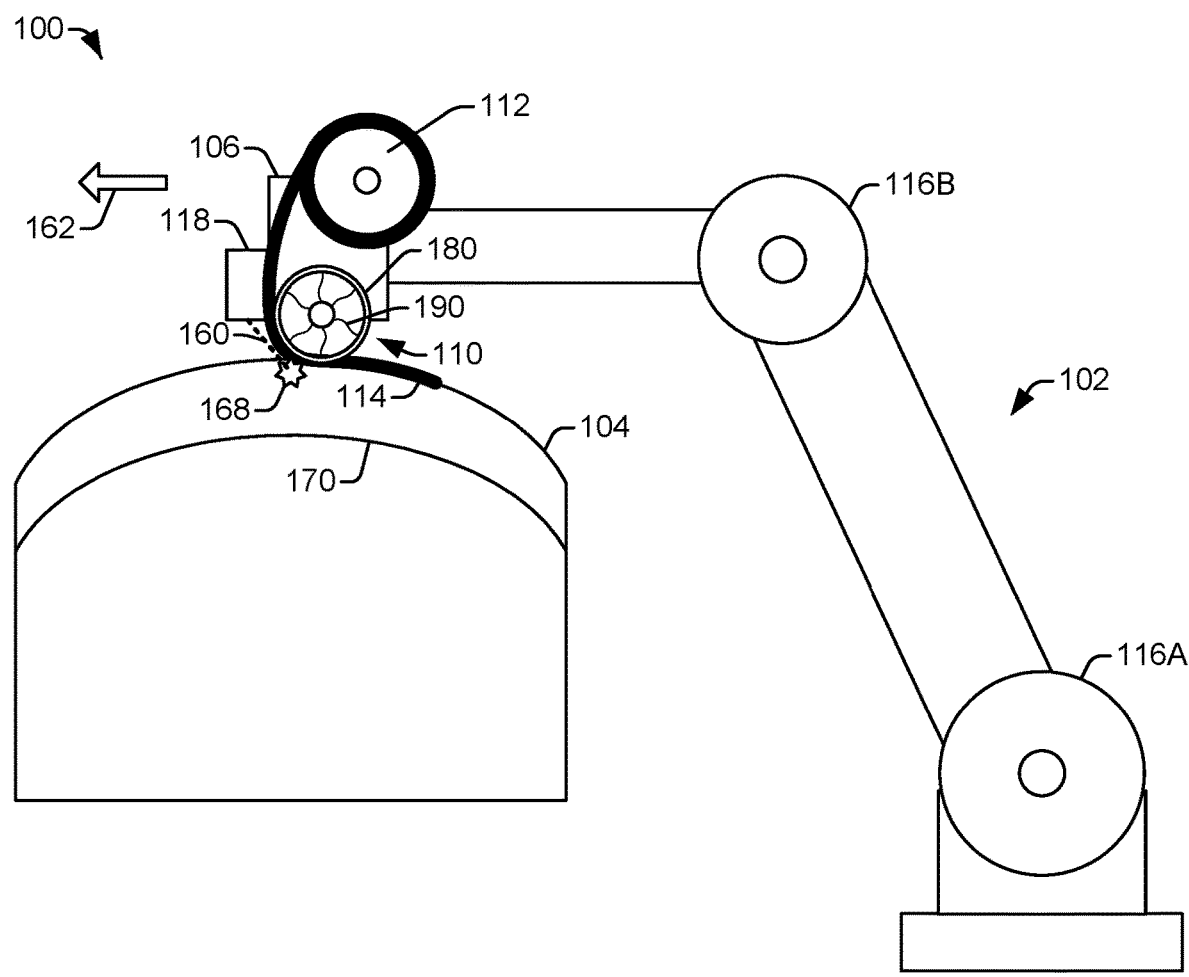
FIG. 2 is a diagram that illustrates an example of the system for automated fiber placement of FIG. 1.

FIG. 2 is a diagram that illustrates an example of the system 100 for automated fiber placement of FIG. 1. In FIG. 2, a portion of the automated fiber placement machine 102 is shown as a robotic arm including a plurality of actuators 116, including a first actuator 116A and a second actuator 116B. The fiber placement head 106 is coupled to an end of the automated fiber placement machine 102. The fiber placement head 106 includes a roller 110, a tow dispenser 112, and a heat source 118. In FIG. 2, the heat source 118 includes a laser which directs the heat 160 toward the portion 168 of the workpiece 104 as a beam of light.

After the portion 168 of the workpiece 104 is heated by the heat source 118, the automated fiber placement machine 102 moves the fiber placement head 106 along the direction of travel 162 and presses the roller 110 toward the workpiece 104. The roller 110 presses a fiber tow 114 into contact with the workpiece 104 to form a layer on the workpiece 104. The heat supplied by the heat source 118 softens a thermoplastic polymer of the fiber tow 114 as the fiber tow 114 is applied to the workpiece 104 and the roller 110 removes heat from the fiber tow 114 to harden the thermoplastic polymer to cause the fiber tow 114 to adhere to the workpiece 104.

Although FIG. 2 illustrates the automated fiber placement machine 102 as a robotic arm, in other implementations, the automated fiber placement machine 102 is arranged in a different configuration. For example, the fiber placement head 106 can be mounted on a gantry system that includes the actuators 116. Also, although FIG. 2 shows the fiber placement head 106 including a single roller 110, in some implementations, the fiber placement head 106 includes more than one roller 110. In such implementations, the rollers 110 can operation concurrently to apply multiple fiber tows 114 to the workpiece 104 at the same time. Further, although FIGS. 1 and 2 show the fiber tows 114 being applied to the workpiece 104, it should be understood that initial layers to form the workpiece 104 are applied to the tooling surface 170. During formation of the initial layer(s) on the tooling surface 170, the heat source 118 may heat a portion of the tooling surface 170 in front of the roller 110 along the direction of travel 162. Alternatively, the tooling surface 170 can include a second heat source (not shown) that heats the tooling surface 170 before or during application of fiber tows 114 to the tooling surface 170.

Figure 3A:
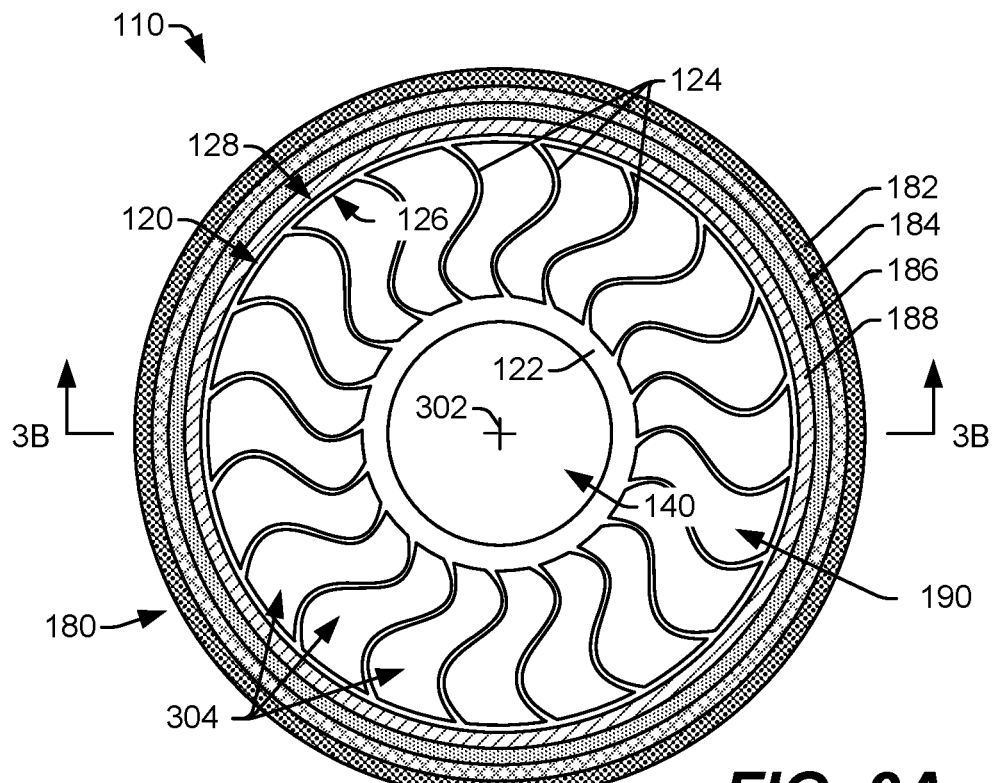
FIGS. 3A, 3B, 3C, and 3D are diagrams illustrating various views of an example of an automated fiber placement roller according to a particular implementation.
Figure 3B:
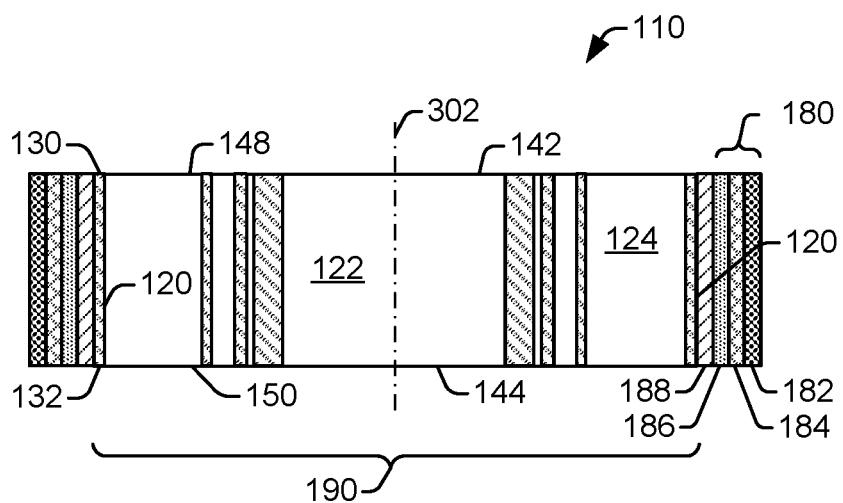
Figure 3C:
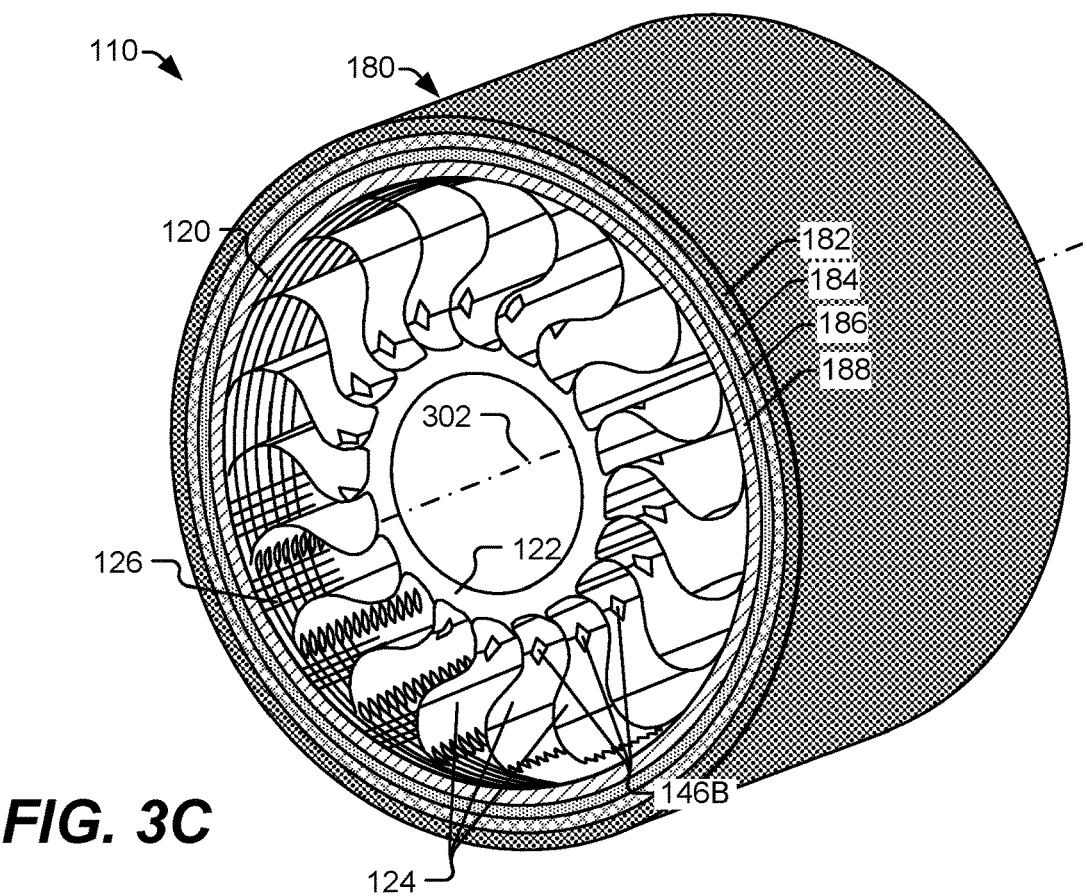
Figure 3D:
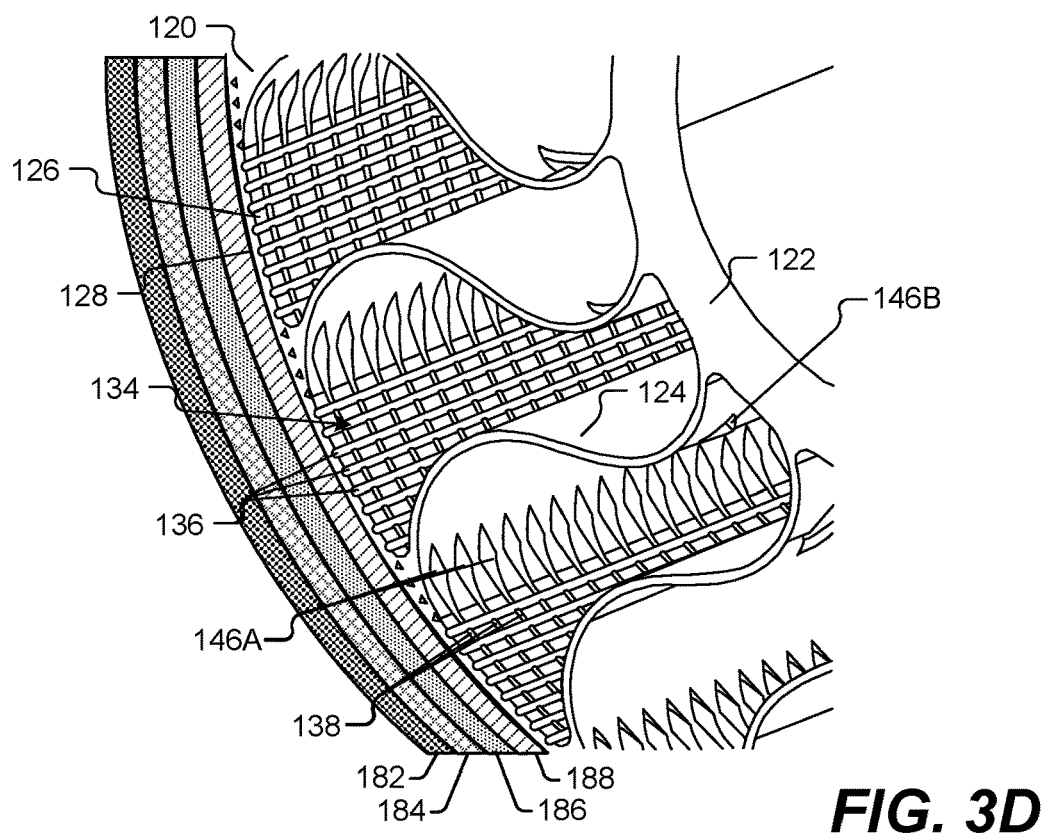

FIGS. 3A, 3B, 3C, and 3D are diagrams illustrating various views of an example of an automated fiber placement roller 110 according to a particular implementation. FIG. 3A shows a view along a central axis 302 of an example of the roller 110 according to a particular implementation. FIG. 3B shows a cross-sectional view taken substantially along cutting line 3B-3B of FIG. 3A. FIG. 3C shows a perspective view of the roller 110 of FIG. 3A. FIG. 3D shows a more detailed perspective view of the inner side 126 and several interconnect members 124 of the roller 110 of FIG. 3A.

FIGS. 3A, 3B, 3C and 3D illustrate the core 190, which includes the flexible rim member 120, the hub member 122, and a plurality of curved interconnect members 124 ("interconnect members") extending between the flexible rim member 120 and the hub member 122. The hub member 122 defines a central opening 140 around the central axis 302. In the example illustrated in FIGS. 3A-3D, the flexible rim member 120 is concentric with the hub member 122 about the central axis 302. A plurality of gaps 304 are defined between the interconnect members 124 to facilitate heat removal and to provide space for flexing (e.g., elastic deformation) of the interconnect members 124. In FIGS. 3A-3D, each of the interconnect members 124 defines an S-shaped curve, in other implementations, the interconnect members 124 define a different curve shape, such as a C-shaped curve.

The flexible rim member 120 includes an outer side 128 and an inner side 126 as shown in FIG. 3A, where the central axis 302 is closer to the inner side 126 than to the outer side 128. The roller skin layer(s) 180 are coupled to the core 190 (e.g., to the outer side 128 of the flexible rim member 120). In FIGS. 3A, 3B, 3C, and 3D, the roller skin layer(s) 180 include the compliant layer 186, the wear layer 184, and the outer layer 182. In some implementations, the roller 110 also includes the insulation layer 188 between the roller skin layer(s) 180 and the core 190.

As best seen in FIG. 3D, the flexible rim member 120 defines a plurality of grooves 134 that increase the flexibility of the flexible rim member 120 relative to an implementation of the flexible rim member 120 without the grooves. In FIG. 3D, the grooves 134 are illustrated on the inner side 126 of the flexible rim member 120; however, in other implementations, grooves 134 are defined on the outer side 128 of the flexible rim member 120, or on both the inner side 126 and the outer side 128. In FIG. 3D, the grooves 134 include multiple axial grooves 136 and multiple circumferential grooves 138 arranged in a grid. In the example illustrated, multiple axial grooves 136 are disposed between each pair of adjacent interconnect members 124. In other implementations, the grooves 134 include only the axial grooves 136 or only the circumferential grooves 138. In yet another implementation, the grooves 134 are arranged in a different manner, such as in a spiral arrangement along the inner side 126.

As best seen in FIGS. 3C and 3D, one or more of the interconnect members 124 includes relief openings 146 which are sized and shaped to tune the elastic deformation characteristics (e.g., stiffness) of the interconnect members 124. In the example illustrated in FIGS. 3C and 3D, the relief openings 146 include first relief openings 146A at a first end (proximate to the inner side 126) of the one or more interconnect members 124 and second relief openings 146B at a second end (proximate to the hub member 122) of the one or more interconnect members 124. In the example illustrated, each of the first relief openings 146A is aligned with a respective one of the circumferential grooves 138.

The number, shape, dimensions, and placement of the first relief openings 146A and the second relief openings 146B are selected in part to provide target elastic deformation characteristics to the roller 110 or the core 190. By omitting material that would be present if the interconnect members 124 did not have relief openings 146, the flexibility of each interconnect member 124 is increased and the stiffness is decreased. Larger relief openings 146 increase the flexibility more than the same number of smaller relief openings 146 because the larger relief openings leave less material of the interconnect member 124 to resist deformation. For similar reasons, more relief openings 146 of a particular size and shape increase the flexibility of the interconnect member 124 more than fewer relief openings 146 of the same size and shape. A relief opening 146 is more effective at increasing flexibility of the interconnect member 124 when the relief opening 146 is positioned near a bend of the interconnect member 124 since the bend provides a natural focus of bending motion of the interconnect member 124.

In some implementations, one or more of the relief openings 146 is shaped to enable additive manufacturing of the interconnect members 124 without use of temporary support structures. For example, an angle formed by edges of a relief opening 146 may be selected, in part, to enable building the interconnect member 124 in a layer-by-layer additive process without the need for temporary support structures to fill in and support portions of the interconnect member 124 that form the edges of the relief opening 146. The specific angle to avoid use of temporary support structures depends on the additive manufacturing process used. In some implementations, the grooves 134 are also shaped to enable additive manufacturing of the flexible rim member 120 without use of temporary support structures.

In some implementations, each of the interconnect members 124 includes a different number of the first relief openings 146A than of the second relief openings 146B. For example, each of the interconnect members 124 defines a first number of the first relief openings 146A and defines a second number of the second relief openings 146B, and the first number is different from the second number. In the example illustrated in FIGS. 3C and 3D, the first number is greater than the second number; however in other implementations, the second number is greater than the first number.

In some implementations, the first relief openings 146A have a different size than the second relief openings 146B.

For example, each of the first relief openings 146A defines a corresponding first opening volume, each of the second relief openings 146B defines a corresponding second opening volume, and the first opening volume is different from the second opening volume. In the example illustrated in FIGS. 3C and 3D, the first opening volume is less than the second opening volume; however in other implementations, the second opening volume is less than the first opening volume.

FIG. 3B shows the first edge 130 of the flexible rim member 120 (e.g., a surface between the inner side 126 and the outer side 128) and the second edge 132 of the flexible rim member 120 (e.g., a surface between the inner side 126 and the outer side 128 on a side opposite the first edge 130). FIG. 3B also shows respective the first and second edges 142, 144 of the hub member 122, and the first and second edges 148, 150 of the interconnect members 124. In the example illustrated, the first edges 130, 142, 148 are substantially coplanar with one another to facilitate fabrication via additive manufacturing (e.g., on a base plate or other support structure). In some implementations, the second edges 132, 144, 150 are also substantially coplanar with one another.

Figure 4A:
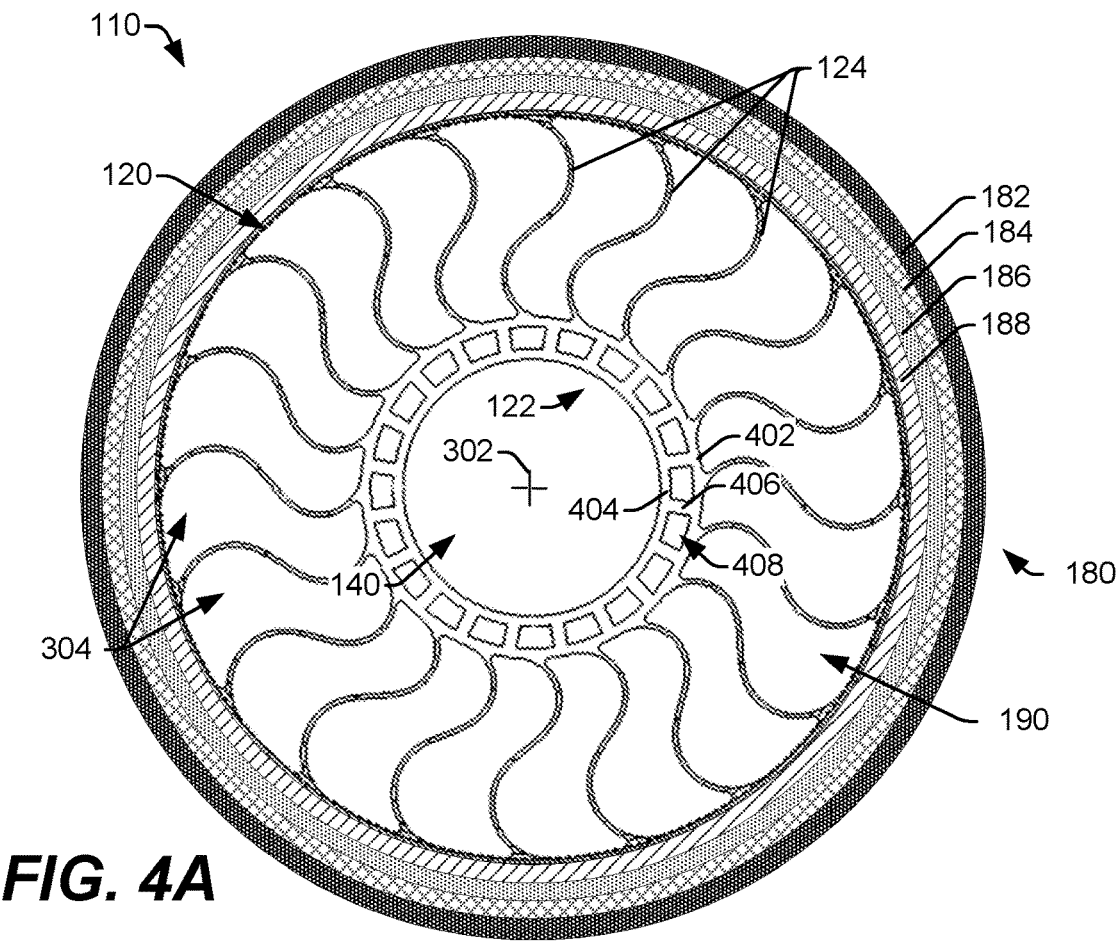
FIGS. 4A, 4B, 4C, and 4D are diagrams illustrating various views of an example of an automated fiber placement roller according to a particular implementation.
Figure 4B:
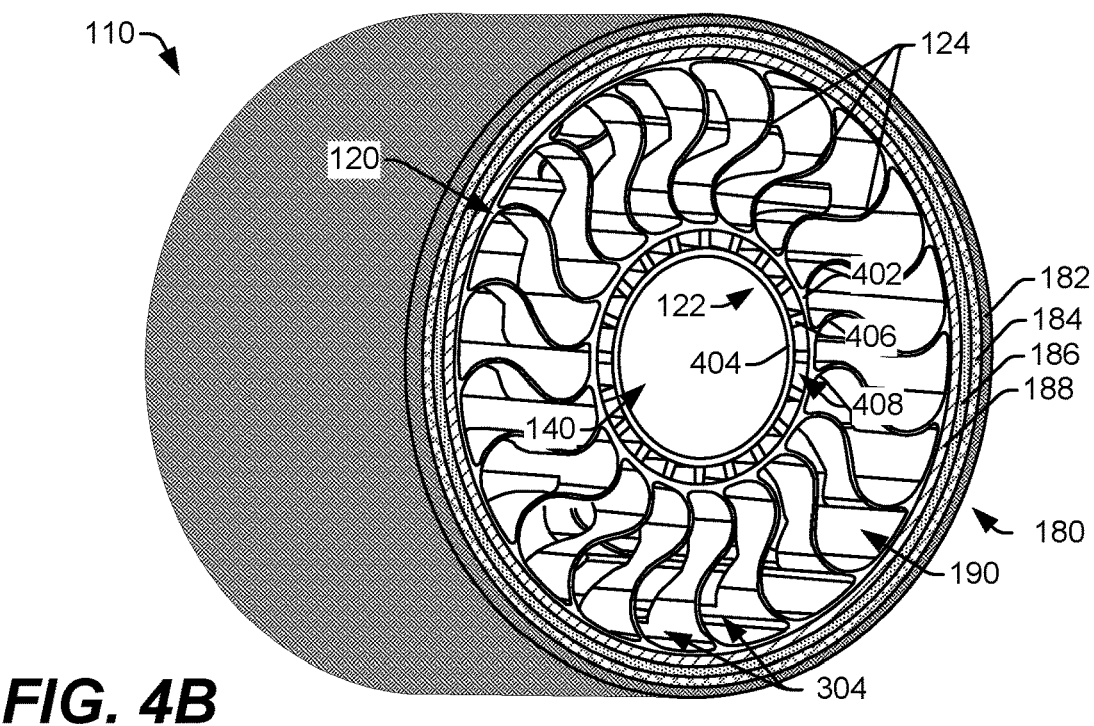
Figure 4C:
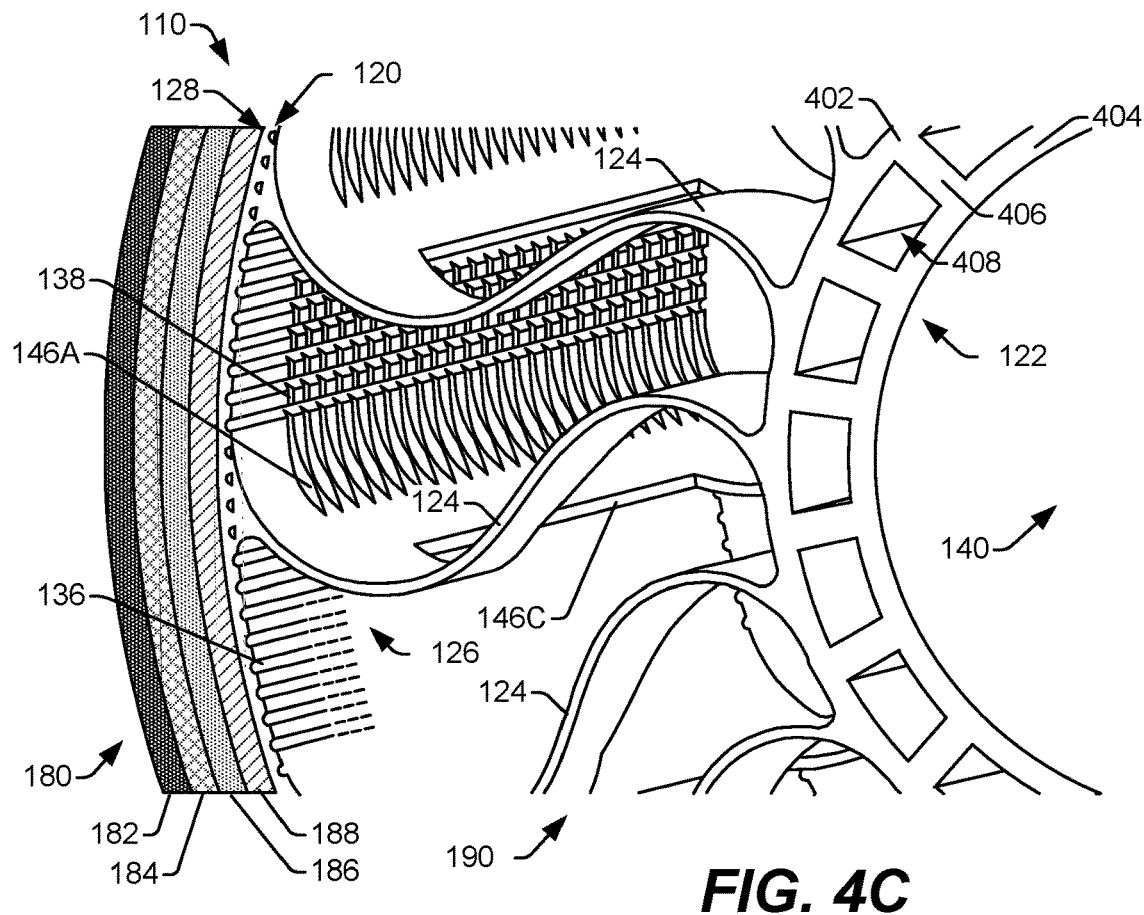
Figure 4D:
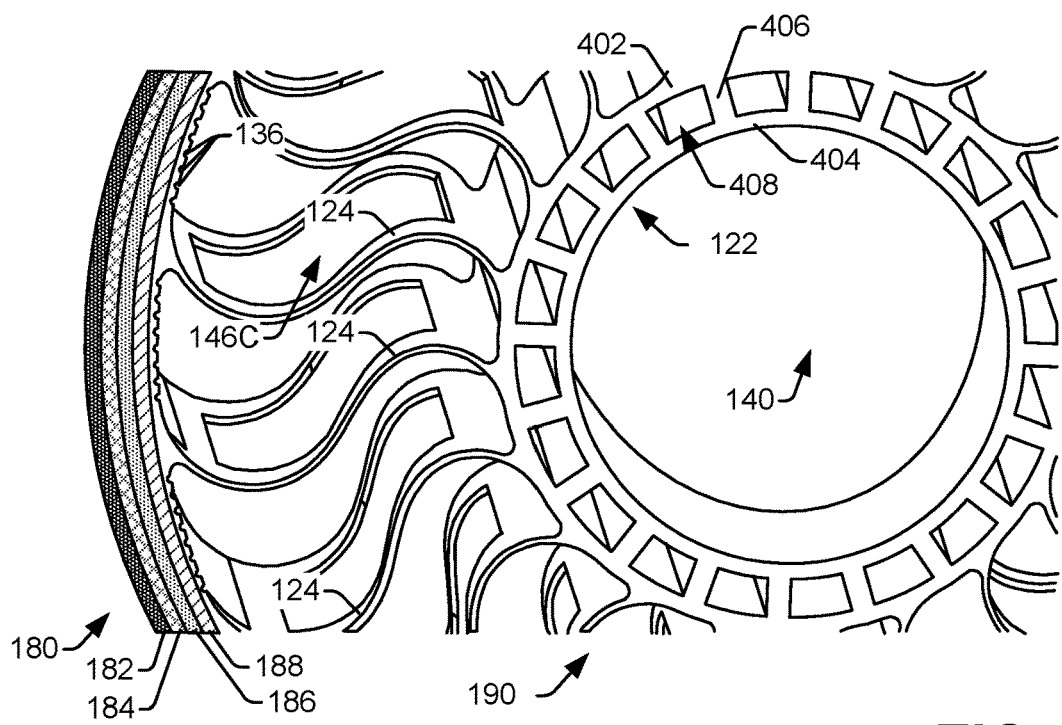

FIGS. 4A, 4B, 4C, and 4D are diagrams illustrating various views of an example of an automated fiber placement roller 110 according to a particular implementation. FIG. 4A shows a view along a central axis 302 of an example of the roller 110 according to a particular implementation. FIG. 4B shows a perspective view of the roller 110 of FIG. 4A. FIG. 4C shows more detailed perspective view of the inner side 126 of the roller 110 of FIG. 4A. FIG. 4D shows more detailed perspective view of several interconnect members 124 of the roller 110 of FIG. 4A.

In FIGS. 4A, 4B, 4C and 4D, the roller includes the core 190 and the roller skin layers 180. The roller skin layers 180 in FIGS. 4A-4D are the same as the roller skin layers 180 of FIGS. 3A-3D and function as described above. For example, the roller skin layers 180 of FIGS. 4A-4D include one or more of the compliant layer 186, the wear layer 184, and the outer layer 182. In some implementations, the roller 110 also includes the insulation layer 188 between the roller skin layers 180 and the core 190.

The core 190 of FIGS. 4A-4D includes the flexible rim member 120, the hub member 122, and a plurality of interconnect members 124 extending between the flexible rim member 120 and the hub member 122. A plurality of gaps 304 (also referred to herein as openings) are defined between the interconnect members 124 to facilitate heat removal and to provide space for flexing (e.g., elastic deformation) of the interconnect members 124. In FIGS. 4A-4D, each of the interconnect members 124 defines an S-shaped curve, in other implementations, the interconnect members 124 define a different curve shape, such as a C-shaped curve.

The hub member 122 of FIGS. 4A-4D defines the central opening 140 about the central axis 302. The hub member 122 of FIGS. 4A-4D includes an inner hub member 404, an outer hub member 402, and one or more spacers 406 between the inner hub member 404 and the outer hub member 402. A plurality of openings 408 are defined in the hub member 122 between the inner hub member 404, the outer hub member 402, and the spacers 406. The openings 408 facilitate additional airflow (e.g., airflow in addition to airflow through the gaps 304) to improve a rate of heat removal from the core 190 during use.

As best seen in FIG. 4C, the flexible rim member 120 defines the plurality of grooves 134 of FIG. 1, including axial grooves 136 and circumferential grooves 138. The grooves 136, 138 increase the flexibility of the flexible rim member 120 relative to an implementation of the flexible rim member 120 without the grooves. In FIG. 4C, the grooves 136, 138 are illustrated on the inner side 126 of the flexible rim member 120; however, in other implementations, grooves 136, 138 are defined on the outer side 128 of the flexible rim member 120, or on both the inner side 126 and the outer side 128. In some implementations, only the axial grooves 136 or only the circumferential grooves 138 are present. In other implementation, the grooves are arranged in a different manner, such as in a spiral arrangement along the inner side 126.

As best seen in FIGS. 4C and 4D, one or more of the interconnect members 124 includes relief openings 146. In the example illustrated in FIGS. 4C and 4D, the relief openings 146 include first relief openings 146A at a first end (proximate to the inner side 126) of the one or more interconnect members 124 and interior relief openings 146C through a body of each interconnect member 124. In the example illustrated, each of the first relief openings 146A is aligned with a respective one of the circumferential grooves 138. The interior relief openings 146C, the first relief openings 146A, or both, are sized and shaped to tune the elastic deformation characteristics (e.g., stiffness) of the interconnect members 124. Additionally, the interior relief openings 146C enable additional airflow (e.g., airflow in addition to airflow through the openings 304) to improve a rate of heat removal from the core 190 during use.

The shape, dimensions, and placement of the interior relief openings 146C, the first relief openings 146A, or both, are selected in part to provide target elastic deformation characteristics to the roller 110 or the core 190. For example, a large interior relief opening 146C in each interconnect members 124 result in great flexibility of the core 190 than does a smaller interior relief opening 146C in each interconnect members 124. The shape and position within each interconnect member 124 of the interior relief openings 146C can be modified to provide specific deformation characteristics, such as increased or decreased stiffness at ends (e.g., edges 130, 132) of the flexible rim member 120.

Figure 5:
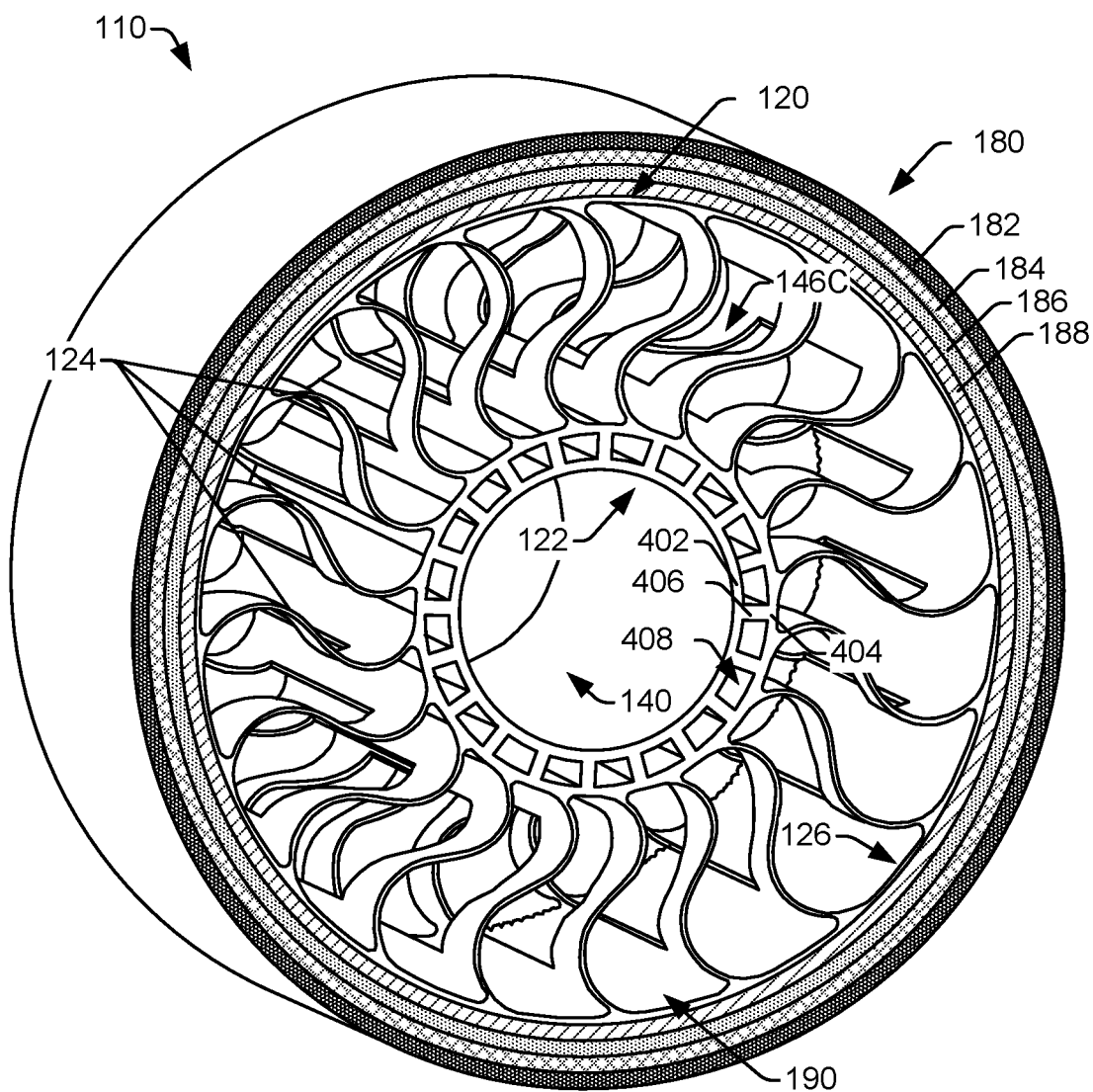
FIG. 5 is a diagram that illustrates another example of an automated fiber placement roller according to a particular implementation.

FIG. 5 is a diagram that illustrates another example of an automated fiber placement roller 110 according to a particular implementation. The automated fiber placement roller 110 illustrated in FIG. 5 is similar to the automated fiber placement roller 110 illustrated in FIGS. 4A-4D except that the flexible rim member 120 does not include the grooves 134 and the interconnect members 124 include the relief opening 146C but not the relief opening 146A. Omission of the grooves 134 and the relief openings 146A simplifies production of the core 190 using some manufacturing processes. For example, while very complex molds or post-casting operations may be used to form the relief opening 146A of the core 190 of FIGS. 4A-4D, simpler molds with fewer or no post-casting operations can be used to form the core 190 of FIG. 5.

Figure 6:
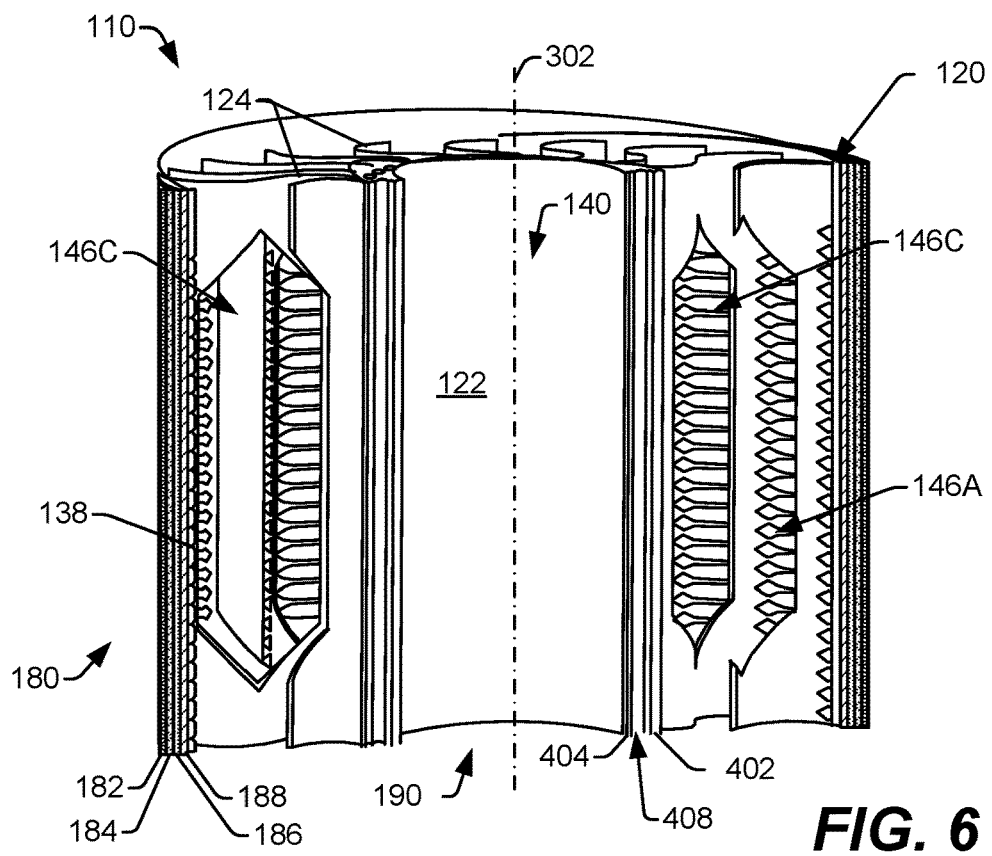
FIG. 6 is a diagram that illustrates another example of an automated fiber placement roller according to a particular implementation.
Figure 7:
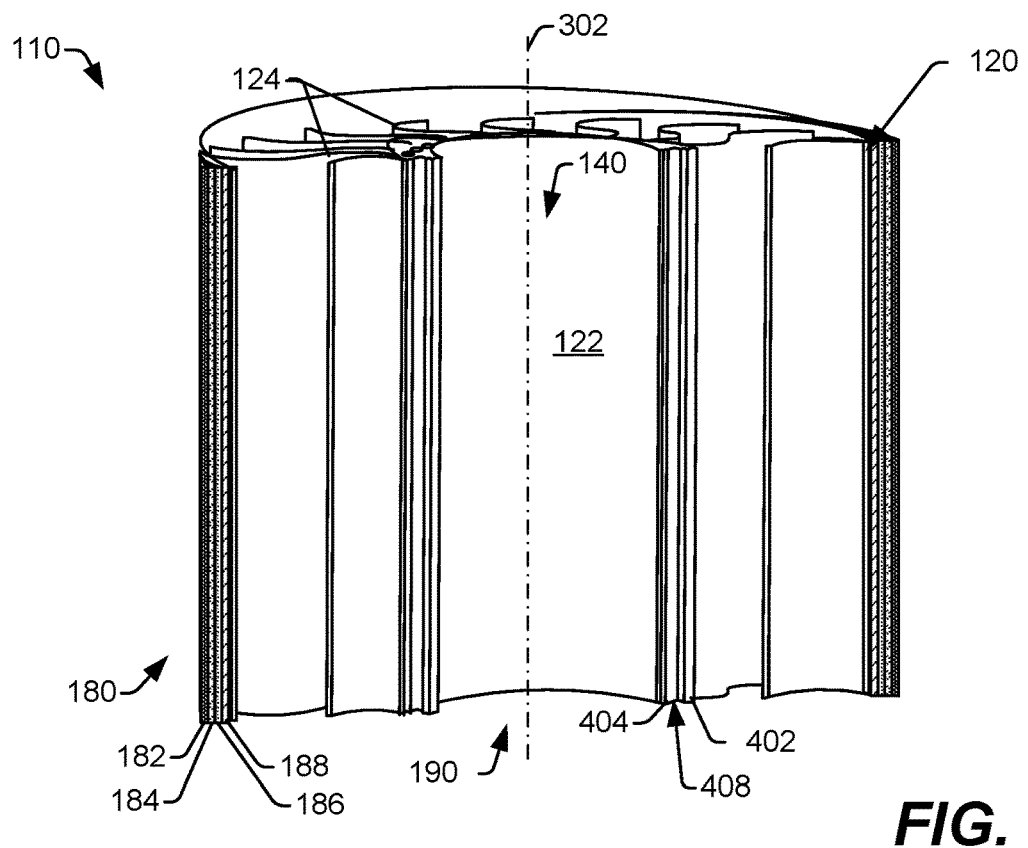
FIG. 7 is a diagram that illustrates another example of an automated fiber placement roller according to a particular implementation.

FIG. 6 is a diagram that illustrates a cross-sectional view (along the central axis 302) of an example of the automated fiber placement roller 110. FIG. 7 is a diagram that illustrates a cross-sectional view (along the central axis 302) of another example of the automated fiber placement roller 110. The rollers 110 of each of FIGS. 6 and 7 include the roller skin layers 180 around the core 190. For example, the rollers 110 of each of FIGS. 6 and 7 include the compliant layer 186, the wear layer 184, and the outer layer 182. The rollers 110 of each of FIGS. 6 and 7 include the insulation layer 188 between the core 190 and the roller skin layers 180.

In FIGS. 6 and 7, each core 190 includes a flexible rim member 120, a hub member 122, and a plurality of interconnect members 124 between the flexible rim member 120 and the hub member 122. The hub member 122 in each of FIGS. 6 and 7 includes an inner hub member 404, an outer hub member 402, and one or more openings 408 disposed between the inner hub member 404 and the outer hub member 402.

In FIG. 6, the interconnect members 124 include the relief openings 146A and the relief openings 146C. Additionally, the flexible rim member 120 of FIG. 6 includes at least the circumferential grooves 138. The flexible rim member 120 of FIG. 6 may also include axial grooves 136, which are not visible in the view illustrated in FIG. 6.

The relief openings 146A and the relief openings 146C of FIG. 6 are shaped and sized to facilitate additive manufacturing of the interconnect members 124 without use of temporary support structures. For example, angles formed by edges of the relief openings 146A and the relief openings 146C may be selected, in part, to enable building the interconnect member 124 in a layer-by-layer additive process without the need for temporary support structures to fill in and support portions of the interconnect member 124 that form the edges of the relief opening 146. The specific angle to avoid use of temporary support structures depends on the additive manufacturing process used. In some implementations, the grooves 138 are also shaped to enable additive manufacturing of the flexible rim member 120 without use of temporary support structures.

The roller 110 of FIG. 7 is similar to the roller 110 of FIG. 6. However, in contrast with FIG. 6, the interconnect members 124 of FIG. 7 do not include relief openings 146. Additionally, in FIG. 7, the flexible rim member 120 does not include grooves 134. Omission of the relief openings 146, the grooves 134, or both, simplifies production of the core 190 using some manufacturing processes. For example, the core 190 of FIG. 7 can be cast using common techniques, such as injection molding or compression molding, and using relatively simple molds.

Figure 8:
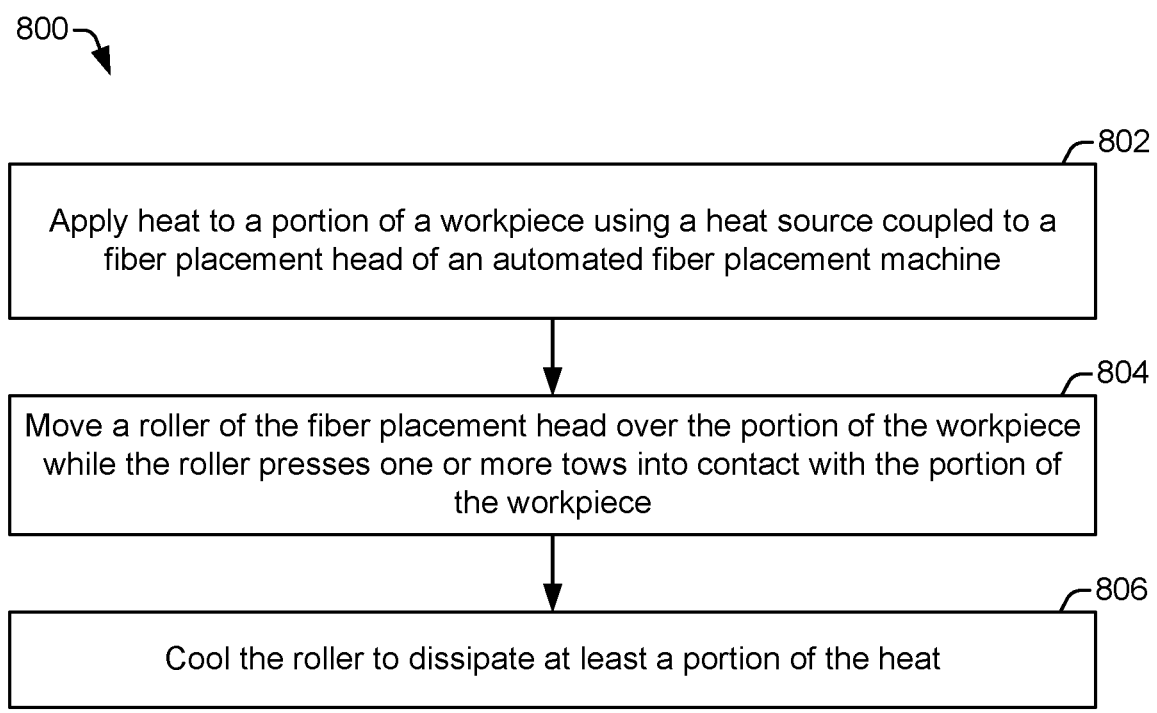
FIG. 8 is a flow chart of an example of a method of automated composite layup.

FIG. 8 is a flow chart of an example of a method 800 of automated composite layup. The method 800 includes, at 802, applying heat to a portion of a workpiece using a heat source coupled to a fiber placement head of an automated fiber placement machine. For example, the heat source 118 directs the heat 160 toward the portion 168 of the workpiece 104 (or of the tooling surface 170). In a particular implementation, the heat source 118 includes a laser source that generates the heat 160 via a beam of light.

The method 800 includes, at 804, after applying the heat to the portion of the workpiece, moving a roller of the fiber placement head over the portion of the workpiece while the roller presses one or more tows into contact with the portion of the workpiece. For example, the roller 110 of FIGS. 1-7 is used to press the fiber tows 114 into contact with the workpiece 104 or the tooling surface 170. In some implementations, the heat source 118 is controlled to heat the portion 168 of the workpiece 104 sufficiently to soften a thermoplastic polymer of the fiber tows 114. For example, the relative motion of the workpiece 104 and the fiber placement head 106 can be controlled to cause the heat source 118 to heat the portion 168 of the workpiece 104 to a working temperature that is greater than a glass transition temperature of the thermoplastic polymer. To illustrate, the heat source 118 can output heat at a relatively constant rate and the relative motion of the workpiece 104 and the fiber placement head 106 is controlled to control the working temperature of the portion 168. In another example, a power output of the heat source 118, an orientation of the heat source 118, or both, are controlled to cause the heat source 118 to heat the portion 168 of the workpiece 104 to a working temperature that is greater than a glass transition temperature of the thermoplastic polymer. To illustrate, the heat output of the heat source 118 can be pulsed or redirected (e.g., scanned) to control the working temperature.

The method 800 also includes, at 806, while moving the roller over the portion of the workpiece, cooling the roller to dissipate at least a portion of the heat. In a particular example, the roller is cooled by airflow through openings between a rim member of the roller, a hub member of the roller, and a plurality of curved interconnect members of the roller. For example, the heat can be conductively transferred from the workpiece 104 to the flexible rim member 120. The rate of heat transfer may be limited, in some implementations, by thermal properties of the roller skin layers 180 and/or the insulation layer 188. The flexible rim member 120 conducts the heat to the interconnect members 124, and the interconnect members 124 transfer to the heat to the airflow 166 (or another coolant) flowing between the openings 304 between the interconnect members 124. In some implementations, the airflow is unidirectional (e.g., from the first edge 130 of the flexible rim member 120 toward the second edge 132 of the flexible rim member 120) to improve heat removal. In some implementations, the roller 110 may also be cooled by additional airflow through openings 408 between an inner hub member 404 and an outer hub member 402.

Although one or more of FIGS. 1-8 may illustrate systems, apparatuses, and/or methods according to the teachings of the disclosure, the disclosure is not limited to these illustrated systems, apparatuses, and/or methods. One or more functions or components of any of FIGS. 1-8 as illustrated or described herein may be combined with one or more other portions of another of FIGS. 1-8. Accordingly, no single implementation described herein should be construed as limiting and implementations of the disclosure may be suitably combined without departing form the teachings of the disclosure. As an example, one or more operations described with reference to FIG. 8 may be optional, may be performed at least partially concurrently, and/or may be performed in a different order than shown or described.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. An automated fiber placement roller comprising:
   a flexible rim member arranged about a central axis and having an inner side and an outer side, wherein the central axis is closer to the inner side than to the outer side;
   a hub member arranged substantially concentric with the flexible rim member about the central axis, wherein the hub member defines an opening to receive a shaft of an automated fiber placement machine;
   a plurality of curved interconnect members extending between the hub member and the flexible rim member, wherein each of the plurality of curved interconnect members is elastically deformable to accommodate deformation of the flexible rim member; and
   one or more roller skin layers coupled to the outer side of the flexible rim member; and
   wherein portions of each of the flexible rim member, the hub member, and the plurality of curved interconnect members are metallic, and wherein portions of each of the flexible rim member, the hub member, and the plurality of curved interconnect members are polymeric.

2. The automated fiber placement roller of claim 1, wherein a plurality of grooves are defined in the flexible rim member.

3. The automated fiber placement roller of claim 1, wherein each of the plurality of curved interconnect members defines an S-shaped curve in a plane orthogonal to the central axis.

4. The automated fiber placement roller of claim 1, wherein the one or more roller skin layers comprise a compliant layer and an outer layer, wherein the central axis is closer to the compliant layer than to the outer layer, wherein the outer layer has a degradation temperature greater than or equal to 425 degrees Celsius, and wherein the compliant layer has a Shore A hardness of between 40 and 100.

5. The automated fiber placement roller of claim 1, further comprising an insulation layer between the one or more roller skin layers and the flexible rim member.

6. The automated fiber placement roller of claim 1, wherein the flexible rim member has a first rim edge corresponding to a surface between the inner side and the outer side, wherein the hub member has a first hub edge, wherein each of the plurality of curved interconnect members has a respective first interconnect edge, and wherein the first rim edge, the first hub edge, and each of the first interconnect edges are substantially coplanar.

7. The automated fiber placement roller of claim 1, wherein the flexible rim member, the hub member, and the plurality of curved interconnect members together are a single monolithic body.

8. The automated fiber placement roller of claim 6, wherein the flexible rim member has a second rim edge opposite the first rim edge, wherein the hub member has a second hub edge opposite the first hub edge, wherein each of the plurality of curved interconnect members has a respective second interconnect edge opposite a corresponding first interconnect edge, and wherein the second rim edge, the second hub edge, and each of the second interconnect edges are substantially coplanar.

9. An automated fiber placement machine comprising:
   a fiber placement head comprising a roller and a shaft extending through a central opening of the roller, wherein the roller is rotatable about the shaft and comprises:
      a flexible rim member arranged about a central axis and having an inner side and an outer side, wherein the central axis is closer to the inner side than to the outer side;
      a hub member arranged substantially concentric with the flexible rim member about the central axis, wherein the hub member defines the central opening;
      a plurality of curved interconnect members extending between the hub member and the flexible rim member, wherein each of the plurality of curved interconnect members is elastically deformable to accommodate deformation of the flexible rim member; and
      one or more roller skin layers coupled to the outer side of the flexible rim member; and
   one or more actuators configured to adjust a relative position of the roller and a workpiece during addition of one or more fiber tows to the workpiece by the fiber placement head; and
   wherein portions of each of the flexible rim member, the hub member, and the plurality of curved interconnect members are metallic, and wherein portions of each of the flexible rim member, the hub member, and the plurality of curved interconnect members are polymeric.

10. The automated fiber placement machine of claim 9, further comprising a heat source configured to, during a fiber placement operation, direct heat toward a portion of the workpiece ahead of the roller along a direction of travel of the roller relative to the workpiece, wherein openings are defined between the plurality of curved interconnect members, the hub member, and the flexible rim member to enable airflow therebetween to remove heat from the roller.

11. The automated fiber placement machine of claim 9, further comprising a heat source configured to, during a fiber placement operation, heat a portion of the workpiece to a local temperature greater than 425 degrees Celsius, and wherein materials of the one or more roller skin layers have degradation temperatures greater than 425 degrees Celsius.

12. An automated fiber placement roller comprising:
   a cylindrical core comprising:
      an outer side arranged about a central axis, a first edge, and a second edge, wherein the cylindrical core defines a plurality of openings that extend between the first edge and the second edge, and wherein the outer side is flexible in a direction parallel to the central axis and is flexible radially relative to the central axis;

a flexible rim member arranged about a central axis and having an inner side and an outer side, wherein the central axis is closer to the inner side than to the outer side;

a hub member arranged substantially concentric with the flexible rim member about the central axis, wherein the hub member defines a central opening, wherein a shaft is configured to extend through the central opening;

a plurality of curved interconnect members extending between the hub member and the flexible rim member, wherein each of the plurality of curved interconnect members is elastically deformable to accommodate deformation of the flexible rim member; and wherein portions of each of the flexible rim member, the hub member, and the plurality of curved interconnect members are metallic, and wherein portions of each of the flexible rim member, the hub member, and the plurality of curved interconnect members are polymeric.

13. The automated fiber placement roller of claim 12, further comprising:

a compliant layer comprising a first material coupled to the outer side of the cylindrical core; and an outer layer comprising a second material coupled to the compliant layer.

14. The automated fiber placement roller of claim 13, wherein the first material comprises a high-temperature silicone polymer material, a fluoroelastomer polymer material, or a silica aerogel material.

15. The automated fiber placement roller of claim 13, further comprising a wear layer between the compliant layer and the outer layer, wherein the wear layer comprises a third material, wherein the third material comprises a fluorinated ethylene propylene polymer material or a perfluoroalkoxy alkane polymer material.

16. The automated fiber placement roller of claim 12, wherein each of the plurality of curved interconnect members defines a relief opening therethrough.

17. The automated fiber placement roller of claim 12, wherein the plurality of openings extending between the first edge and the second edge of the cylindrical core enable unidirectional airflow between the first edge and the second edge through the cylindrical core.

18. The automated fiber placement roller of claim 13, wherein the second material comprises a polybenzimidazole polymer material or high-temperature silicone polymer material.

19. The automated fiber placement roller of claim 12, wherein each of the plurality of curved interconnect members defines an S-shaped curve in a plane orthogonal to the central axis.

20. The automated fiber placement roller of claim 12, wherein a plurality of grooves are defined in the flexible rim.

* * * * *